Sept. 1, 1964     E. R. PRICE ETAL     3,146,682
FLUID PRESSURE MOTOR CONSTRUCTION
Filed April 20, 1962                    4 Sheets-Sheet 1
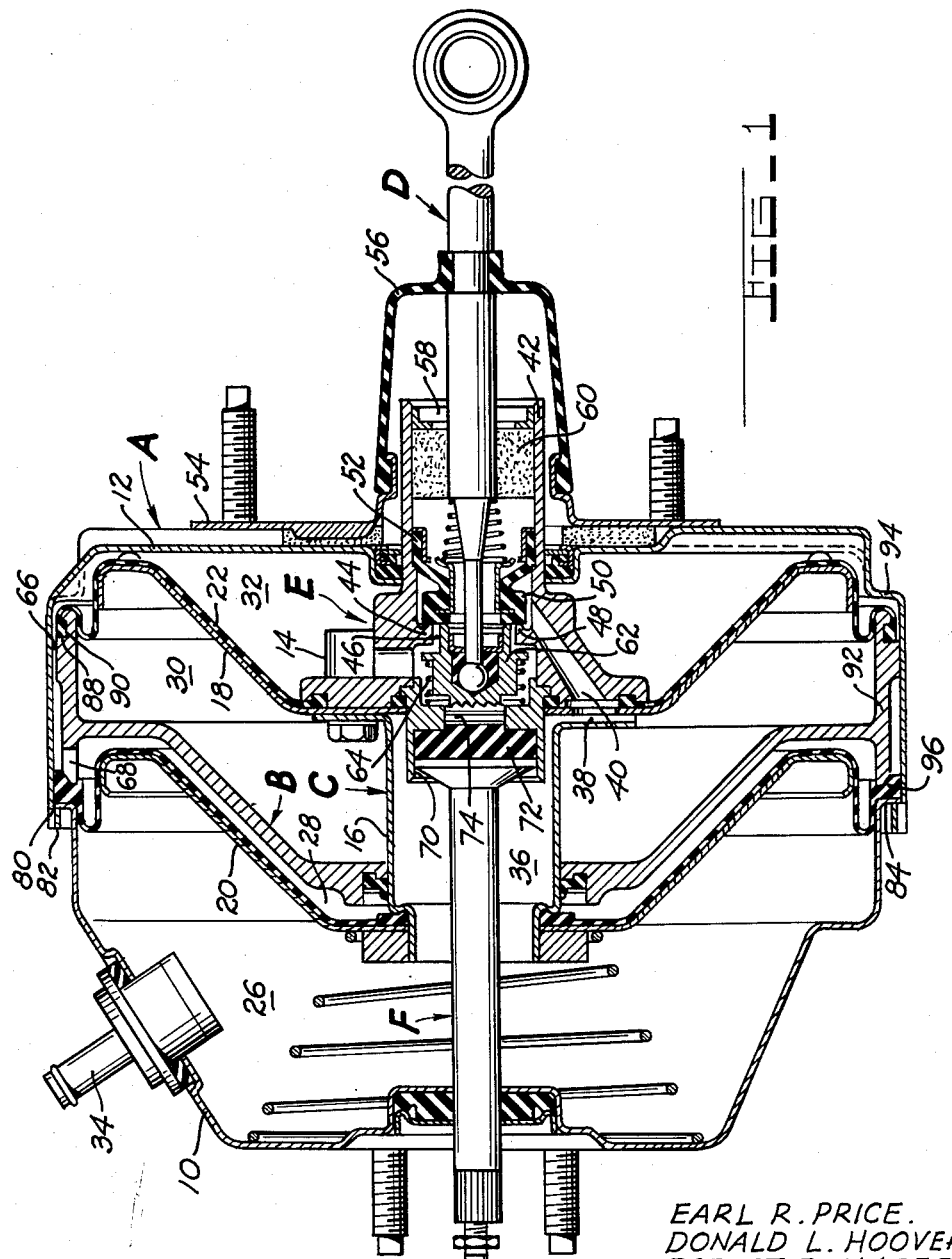
EARL R. PRICE.
DONALD L. HOOVER
ROBERT R. HAGER.
GUNTHER PFEIFER
         INVENTORS.
BY
*ATTORNEY.*

Sept. 1, 1964  E. R. PRICE ETAL  3,146,682
FLUID PRESSURE MOTOR CONSTRUCTION
Filed April 20, 1962  4 Sheets-Sheet 2
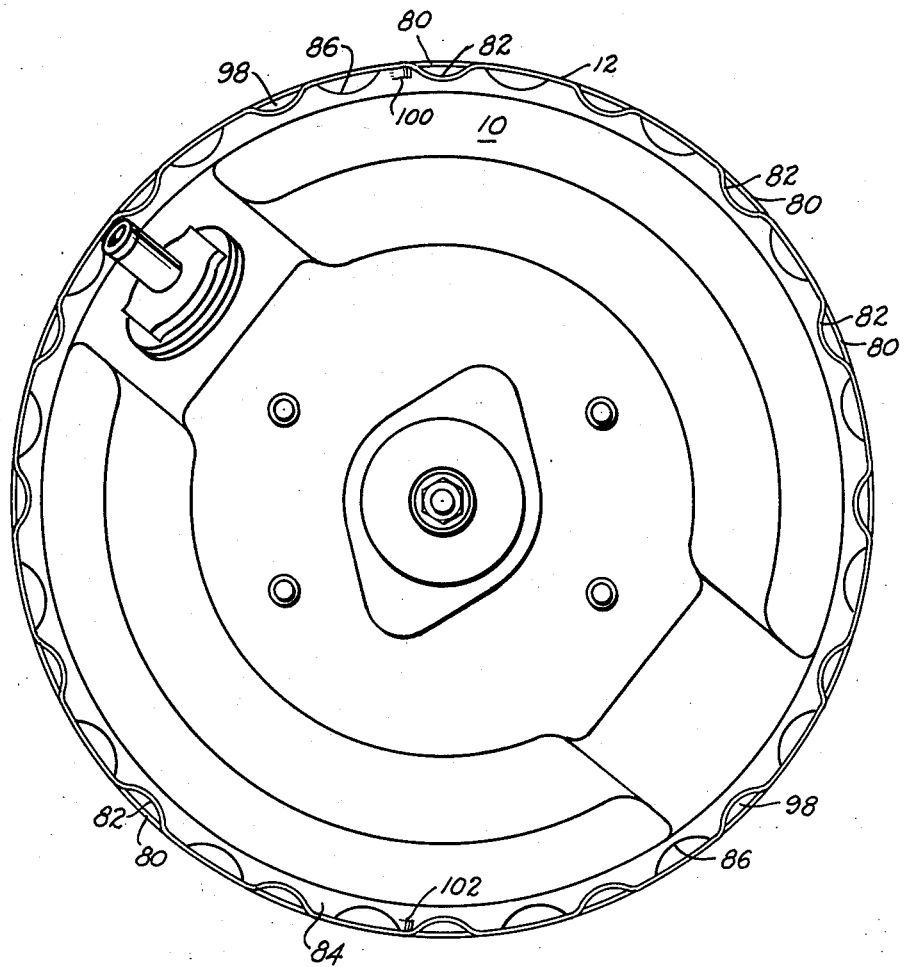
FIG_2
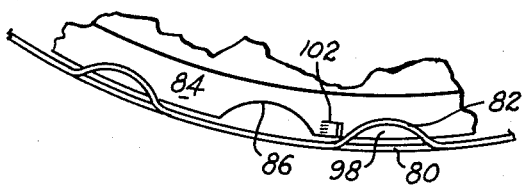
FIG_3
INVENTORS.
EARL R. PRICE
DONALD L. HOOVER.
ROBERT R. HAGER.
GUNTHER PFEIFER.
BY
ATTORNEY.

Sept. 1, 1964   E. R. PRICE ETAL   3,146,682
FLUID PRESSURE MOTOR CONSTRUCTION
Filed April 20, 1962   4 Sheets-Sheet 3
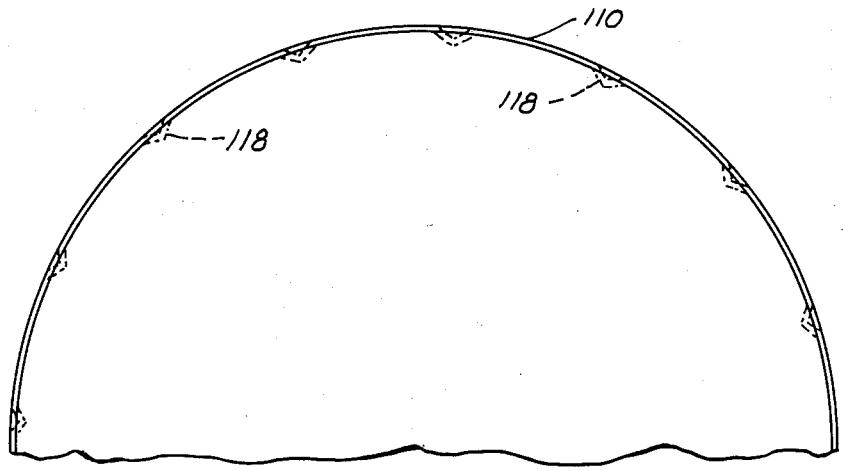
FIG_4
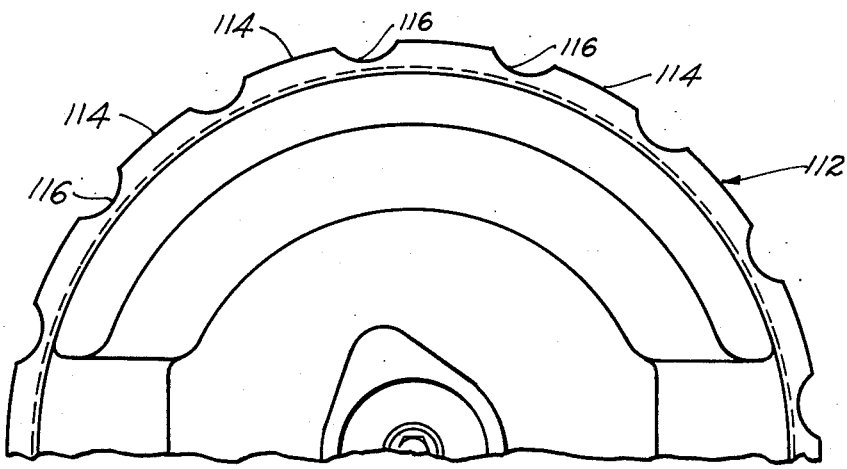
FIG_5
INVENTORS
EARL R. PRICE,
DONALD L. HOOVER
ROBERT R. HAGER,
GUNTHER PFEIFER
BY William P. Hickey
ATTORNEY.

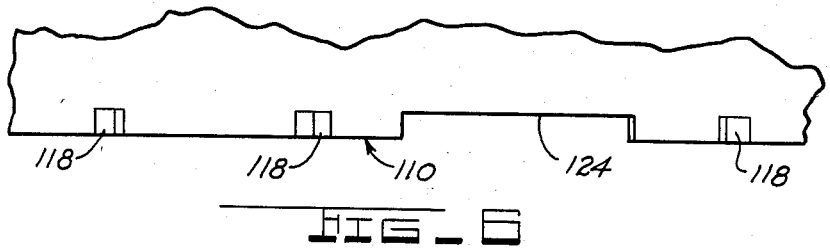
FIG_6
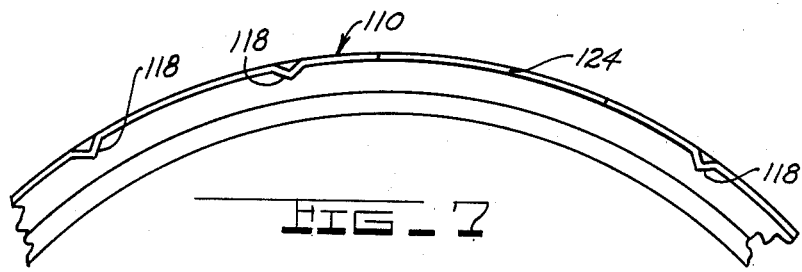
FIG_7
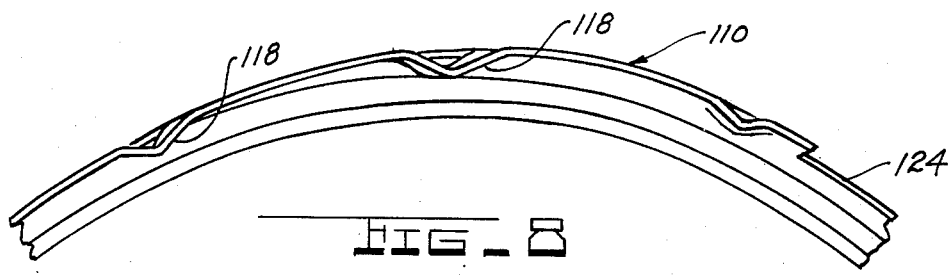
FIG_8
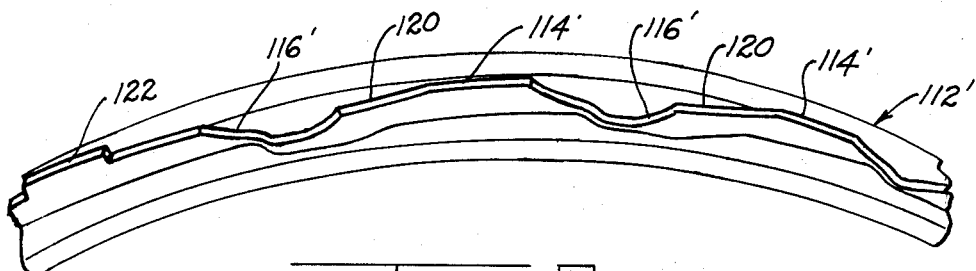
FIG_9
INVENTORS
EARL R. PRICE.
DONALD L. HOOVER.
ROBERT R. HAGER.
GUNTHER PFEIFER.
BY William P. Hickey
ATTORNEY.

United States Patent Office 3,146,682
Patented Sept. 1, 1964

3,146,682
FLUID PRESSURE MOTOR CONSTRUCTION
Earl R. Price, Donald L. Hoover, Robert R. Hager, and Gunther Pfeifer, South Bend, Ind., assignors to The Bendix Corporation, South Bend, Ind., a corporation of Delaware
Filed Apr. 20, 1962, Ser. No. 189,212
5 Claims. (Cl. 92—99)

The present invention relates to a new and improved construction for the shells of fluid pressure motors and the like; and more particularly to an inexpensive housing for a fluid pressure servomotor. The present application is a continuation-in-part of our copending application Serial No. 39,932 filed June 30, 1960 now Patent No. 3,083,698.

An object of the present invention is the provision of a new and improved construction for securing end sections of the shell of a fluid motor and the like together.

Another object of the present invention is the provision of a new and improved stamped sheet metal shell for a fluid pressure motor and the like.

A more specific object of the present invention is the provision of a new and improved fluid pressure motor housing having a new and improved stamped configuration for locking its end sections together.

The invention resides in certain constructions and combinations and arrangements of parts; and further objects and advantages will become apparent to those skilled in the art to which the invention relates from the following description of the preferred embodiment described with reference to the accompanying drawings forming a part of this specification, and in which:

FIGURE 1 is a cross sectional view of a tandem piston vacuum submerged fluid pressure servomotor embodying principles of the present invention;

FIGURE 2 is an end elevational view of the servomotor shown in FIGURE 1;

FIGURE 3 is an enlarged fragmentary view of the locking means used to fasten the two end sections of the servomotor housing together;

FIGURE 4 is an open end view before assembly of the right hand shell section as seen in FIGURE 1—the view showing radially inwardly deformed portions by means of dot-dash lines which are preferably made during assembly, and which retain the left hand shell section as seen in FIGURE 1 in assembled position;

FIGURE 5 is an end view showing the left hand shell section as seen in FIGURE 1 before assembly;

FIGURE 6 is a fragmentary plan view of another embodiment of shell section constructed in accordance with principles of the present invention, and further having provisions for metal-to-metal engagement of the shell section;

FIGURE 7 is a fragmentary end view of the embodiment shown in FIGURE 6;

FIGURE 8 is a fragmentary perspective view of the embodiment of shell section shown in FIGURES 6 and 7; and FIGURE 9 is a fragmentary perspective view of a cover section adapted to be used with the shell section shown in FIGURES 6, 7 and 8.

The fluid pressure servomotor shown in FIGURE 1 generally comprises a tandem piston vacuum submerged unit whose shell is formed by means of a front cover section 10 and a rear section 12 as will later be described in detail. The internal chamber of the shell A is divided into front and rear sections by means of an internal partition member B; and the movable wall structure or power piston C of the motor is formed by a centrally located rigid structure which slidingly sealingly projects through the partition member B so as to have portions lying forwardly and rearwardly of the partition member B. This movable wall structure C is formed by means of a cast hub 14 that is axially positioned rearwardly of the partition member B and to which is suitably bolted a tubular boss or projection 16 which extends forwardly through the partition member B. A suitable diaphragm plate 18 is bolted between the tubular boss 16 and hub 14, and another diaphragm plate 20 is suitably fixed to the portion of the hub 16 that is positioned forwardly of the partition member B. Diaphragms 22 and 24 are suitably positioned on the rear surfaces of the diaphragm plates 18 and 20 respectively with their radially inner edges sealed to the movable wall structure C, and their radially outer ends suitably fixed to the shell of the servomotor A. The front diaphragm 24 therefore divides the space forwardly of the partition member B into front and rear power chambers 26 and 28 respectively, and the rear diaphragm 22 divides the space rearwardly of the partition member B into front and rear power chambers 30 and 32 respectively.

The servomotor shown in the drawing is of the type which is actuated by means of vacuum-to-atmospheric pressure differential, and has further been designed so that vacuum is communicated to all of the power chambers 26, 28, 30 and 32 in the normal de-energized condition of the servomotor. Control of the servomotor is had by means of the valve structure E which is positioned in and carried by the movable wall C, and in which in turn is actuated by means of the push rod or control rod D. Vacuum is continually communicated to the front power chamber 26 by means of the connection 34, from whence it flows through the central opening 36 of the tubular boss 16 to a lateral opening 38 which communicates both with the front power chamber 30 and a passageway 40 leading to the control valve structure E.

The cast hub 14 which forms the various passages of the control valve structure E is provided with a rearwardly extending tubular projection 42 which extends out through and is suitably sealed with respect to the rear end structure of the servomotor shell A. The hub 14 is provided with an internal partition 44 having an axially extending opening therethrough forming the control port 46 of the valve structure E, and which is surrounded with a rearwardly facing vacuum valve seat 48. An annular valve closure member 50 is positioned rearwardly of the vacuum valve seat 48 for abutment therewith, and the valve closure member 50 is provided with a rearwardly and radially outwardly extending diaphragm portion 52 which is suitably clamped and sealed with respect to the sidewalls of the rearwardly extending tubular portion 42. A mounting plate 54 is spot-welded to the rear face of the shell A surrounding the tubular projection 42 in a manner providing for the passage of air between the shell A and plate 54 to the region surrounding the tubular projection 42. A flexible boot or dirt seal 56 is provided between the plate 54 and push rod D to cause air to flow around the tubular projection and into its internal opening 58 through annular filter material 60. It will be seen therefore that air pressure is at all times free to flow through the central opening of the annular valve closure member 50, and this flow of air is controlled by means of a poppet member 62 which is generally located forwardly of the partition 44, but which has a projection which extends through the control port 46 for abutment with the valve closure member 50. The poppet member 62 is normally biased rearwardly by a valve return spring 64 with sufficient force to lift the valve closure member 50 out of engagement with the vacuum valve seat 48. When no actuating force is applied to the control rod D, therefore, the control valve structure E will be in the position shown in the drawing—wherein vacuum is free to flow through the passageway 40 and around the vacume valve seat 48 to the control port 46, and hence to the rear power chamber 32. From rear power chamber 32, air flows around the end of the partition member B into the annular space 66 between the partition member B and the sidewalls of the shell A to an opening 68 which communicates with the rear power chamber 28. Force from the movable wall structure C is transmitted to a conventional master cylinder, not shown, through a force transmitting member F, one end of which is received in a large diameter bore 70 in the forward end of the cast hub 14. A block of rubber 72 is positioned in the bore 70 between the force transmitting member F and the inner surface of the bore; and in order to transmit reaction force to the control valve structure E, the forward end of the poppet member 62 is positioned in a small diameter opening 74 communicating with the block of rubber 72. Compression of the rubber causes it to flow against the poppet member 62 and exert a reactive force thereon.

As previously indicated the servomotor shown in the drawings is caused to be power actuated by forcing the push rod D forwardly into the servomotor unit. From the at rest position shown in the drawing, poppet member 50 moves forwardly into engagement with the vacuum valve seat 48, following which the atmospheric valve seat 76 is moved out of engagement with the valve closure member 50 to communicate atmospheric pressure to the rear power chambers 28 and 32 respectively. Differential pressure is thereby created across the diaphragms 22 and 24 causing the hub and tubular boss 16 to be moved forwardly thereby transmitting force to the rubber block 72 to cause the force transmitting member F to energize the master cylinder, not shown, which is attached thereto. When forward movement of the control rod D is stopped, air flow continues to the power chambers 28 and 32 for a slight interval thereafter, to cause the hub structure 14 to move forwardly by an amount sufficiently to allow the valve closure member 50 to again abut the vacuum valve seat 48—thereby preventing further pressure differential to be created across the diaphragms 22 and 24. When it is desired to reduce the braking effort produced by the servomotor, the control rod D is retracted or moved rearwardly causing the poppet member 62 to lift the valve closure member 50 out of engagement with the vacuum valve seat 48, and thereby communicate vacuum to both of the rear power chambers 28 and 32 respectively. The differential pressure across the diaphragms 24 and 22 is thereby reduced so that the hydraulic pressure in the master cylinder causes the force transmitting member F to move the movable wall structure C rearwardly. When it is desired to stop further reduction in braking effort, the rearward movement of the push rod D is stopped, following which the movable wall structure C moves rearwardly a slight amount to again bring the vacuum valve seat 48 into engagement with the valve closure member 50, and thereby prevent further reduction in the force being developed by the servomotor. A complete removal of force on the control rod D permits the valve return spring 64 to hold the valve closure member out of engagement with the vacuum valve seat 48 and thereby permit full vacuum to be developed in both of the rear power chambers 28 and 32 and thereby causing the movable wall structure C to assume the position shown in the drawing.

According to principles of the present invention, the servomotor structure shown in the drawing is made so that it can be assembled quickly, and so that the housing sections 10 and 12 can be locked together by a novel interlocking structure which is formed as part of the sheet metal parts themselves. The rear shell section 12 is stamped from a piece of sheet metal into a generally cup shaped structure, and is thereafter slotted circumferentially at equally spaced points a slight distance rearwardly from its open end. The strips 82 between the slots 80 and the open end of the cup structure 12 are thereafter bowed radially inwardly to provide a locking structure best seen in FIGURES 2 and 3 of the drawing. In the embodiment shown in FIGURES 1, 2 and 3 of the drawings, sixteen strips 82 are provided in the sidewalls of the shell 12, and are equally spaced around its circumference a slight distance inwardly from its opened end. The front cover section 10 of the servomotor housing is also stamped from a piece of sheet metal, and is provided with a radially turned flanged section 84 of the periphery of which is provided with a predetermined clearance with respect to the internal sidewalls of the shell 12. The flange 84 of the section 10 is scalloped out as at 86 at sixteen equally spaced points around its periphery to an arcuate shape which will accommodate the bowed sections 82, so that the cover section 10 can be inserted into the open end of the section 12 with the bowed sections 82 passing through the scalloped sections 86 of the cover section 10.

As best seen in FIGURE 1, the internal partition member B has an axially extending peripheral flange 92 that fits into the shell section 12 in a manner permitting the rear diaphragm 22 to be folded over its most rearward end with the bead 88 of the diaphragm being received in the groove 90 in the outer periphery of the flange 92. The shell section 12 is bent radially inwardly to provide a shoulder 94 against which the edge of the diaphragm 22 can be positioned, and the shoulder 94 is so positioned as to permit the bead 96 of the diaphragm 24 to be clamped between the forward end of the flange 92 and the flange 84 of the cover section 10 when it is locked behind the bowed sections 82.

It is intended that the movable wall structure C and partition member B will be assembled before placing into the shell section 12; and that the outer cover section 10 will be forced into the opened end of the section 12 to compress the bead 80 into sealing engagement between the inner sidewalls of the shell section 12 and the flange 84 before the edges of the flange 84 are rotated in behind the bowed sections 82. In order that the flange 84 will be prevented from being rotated clockwise beyond the point where its full diameter sections or tabs 98 are centered behind the bowed sections 82, a tab 100 is bent axially forwardly from one of the sections 98 so that it abuts the inner surface of one of the bowed sections 82 and prevents further rotation of the cover member 10. The tab 100, in the preferred embodiment shown in the drawing, projects approximately .060 of an inch out of the end face of the flange 84. It is further contemplated that the cover member 10 can also be locked against rotation in a counterclockwise direction by means of a similar tab 102 which faces in the opposite circumferential direction. The tab 102 will preferably only be bent a slight amount outwardly of the face of the flange 84 (approximately .020 of an inch) so that it can yield or be bent rearwardly behind one of the bowed sections 82 as the cover plate 10 is rotated clockwise into its locking position shown in the drawing.

As explained above, the two shell sections can be provided with their mating configurations before assembly, and assembly of the sections can be quickly accomplished by pressing the two shell sections axially together and then rotating one relative to the other a slight amount; so that the radially inward indentations 82 ride over the peripheral portions 80 of the other shell section. In the interlocking structure of the present invention, the configuration of the present invention has further advantages which are not at first readily apparent, and which advantages are not found in the prior art. As explained in the copending application, Serial No. 112,741 filed May 1, 1961 that is assigned to the assignee of the present invention, it has been found that the outer edge of the flange 84 is sufficiently stiff, and the shell section 12 sufficiently flexible, that the shell section 12 can be deformed inwardly against the flange section 84 (by an amount corresponding to the necessary clearance for slipping the shell sections together) by means of a die aligned with the axially outer face of the flange 84 to shear the shell section 12 on a line corresponding with the outer face of the flange 84. The shearing takes place with such accuracy that the indentations 82 so formed will retain the shell sections 10 and 12 together without any appreciable axial movement following the shearing operation. It will be noted that the flange section 84 of the shell cover 10 acts as its own die for the shearing operation; and that an internal die part is not required to effect the piercing and shearing of the shell section 12.

FIGURE 4 of the drawings shows a cylindrical outer shell section 110 that is to be assembled to the shell section 112 shown in FIGURE 5 of the drawings by the above described shearing operation. The shell section 110 corresponds generally to the shell section 12 as seen in FIGURES 1, 2 and 3 and differs principally therefrom in that it is cylindrically shaped prior to assembly. The cover plate 112 is identical with the shell section 10 of the embodiments shown in FIGURES 1, 2 and 3 and may or may not also include the tabs 100 and 102 that are shown in FIGURES 2 and 3. The shell cover plate 112 is inserted into the opened end of the shell section 110 to compress the bead 96 of the diaphragm 24 to a predetermined loading; and thereafter, suitable triangularly pointed dies are brought radially inwardly against the cylindrical shell section 110 to shear the shell section 110 in the manner shown by the dot-dash lines of FIGURE 4 to provide inwardly deformed portions 118 which abut the outer peripheral portions 114 to hold the shell section and cover plate together. It will be seen that the configuration of the present invention permits an immediate, swift, and rugged locking together of the parts which is a definite advantage not found in any prior art structures with which applicants are familiar.

When it is desired to take the shell sections of the servomotor apart, it is only necessary to rotate the cover plate 112 a slight amount relative to the shell section 110 to bring the scallops 116 into alignment with the indentations 118. The unit can be serviced and put back together again by pressing the plate 112 down upon the bead 96 of the diaphragm 24 by an amount which compresses the bead sufficiently to permit the peripheral portions 114 to rotate in behind the deformed sections 118. If it should be desired to obviate the necessity of providing separate means for producing an axial force to compress the bead 96 of the diaphragm 24, the peripheral edge portions 114 may be deformed slightly as shown in FIGURE 9 of the drawings to provide inclined areas 120. The inclined areas 120 ride against the inner edge of the deformed sections 118 during a twisting of the parts together to produce the desired squeezing of the bead portion 96 of the diaphragm 24. Those portions of the embodiment shown in FIGURE 9 which are similar to corresponding portions of the embodiment shown in FIGURE 5 are designated by a like reference numeral characterized further in that a prime mark is affixed thereto. The radially inner portion of the flange forming portion 114' is of course rounded at its point of juncture with the axially turned portion of the cover plate 112'; and the inclined portions 120 are conveniently formed by stamping the flange 114' axially adjacent corresponding sides of the scallops 116' in a manner to include approximately one-half of the scallops 116'. The portions of the flange 114' adjacent the scallops 116' are thereby bent at a slight angle inwardly with respect to the face of flange 114' to provide the ramps 120.

The cover plate 112' shown in FIGURE 9 can be fitted either into the shell section 12, or the shell section 110 that has had indentations 118 previously made. The indentations 118 will pass through the scallops 86, 116 or 116' as the case may be, and thereafter a counterclockwise rotation causes the indentations 118 to ride against the ramps 120 to compress the bead 96 of the diaphragm 24 until the indentations 118 engage the planer portions of the flange 114'. Pressure forces on the shell sections 10 and 12, as well as 112 and 110 can cause some axial movement of the shell sections by reason of the resilient nature of the bead 96 if insufficient compression of the bead 96 is had during assembly. If so desired, this tendency toward axial movement can be entirely eliminated by providing two or more suitable abutments 122 on the cover plate 112' which engage the outer edge of the shell section 110' when the shell section and cover plate are assembled. This can be done in many ways either by bending the abutments 122 axially outwardly and then radially outwardly to engage the planar end surface of the shell section 110'; or the outer edge portion of the shell section 110' can be slightly recessed as at 124 to receive the abutments 122. As previously mentioned, the ramps 120 as well as the abutments 122 and 124 are not necessary, and may or may not be used depending upon the tools which will be used during servicing and reassembly of the unit.

It will be apparent that the objects heretofore enumerated have been accomplished, and that there has been provided an inexpensive stamped configuration for two shell sections of a fluid pressure motor and the like which will lock the sections together when they are rotated a slight amount, and which structure is more inexpensive to produce than any structure used heretofore.

While the invention has been described in considerable detail, we do not wish to be limited to the particular constructions shown and described; and it is our intention to cover hereby all novel adaptations, modifications and arrangements thereof which come within the practice of those skilled in the art to which the invention relates.

We claim:

1. In a fluid pressure servomotor and the like: a stamped open ended sheet metal shell forming an axially-extending internal chamber of predetermined uniform cross section adjacent its open end, abutment means around the internal periphery of said shell and spaced a predetermined distance from said open end of said shell, said shell being slit at generally equally spaced intervals around the periphery of said uniform section of said shell a predetermined distance axially outwardly of said abutment means to provide bendable portions of said shell between said slits and its open end, said portions being bent radially inwardly, an end cover plate having a sliding fit with respect to the inside predetermined cross section of said shell, the periphery of said cover plate being notched radially inwardly at intervals matching said bent portions of said shell to be capable of receiving said bent portions said periphery of said cover plate also being formed with inclined areas between said notched intervals, and a movable wall in said chamber and having a diaphragm portion the outer edge of which is operatively clamped between said abutment means and said cover plate, said radially inwardly bent portions of said shell extending radially inwardly over the inclined areas of said periphery of said cover plate intermediate said notches to lock said cover plate to said shell to compress said diaphragm portion outer edge against said abutment means.

2. In a fluid pressure servomotor and the like: a stamped open ended sheet metal shell forming an axially extending internal chamber of predetermined uniform cross section adjacent its open end, abutment means around the internal periphery of said shell and spaced a predetermined distance from said open end of said shell, said shell being slit at generally equally spaced intervals around the periphery of said uniform section of shell a predetermined distance axially outwardly of said abutment means to provide bendable portions of said shell between said slits and its open end, said portions being arcuately bent radially inwardly to identical radii, an end cover plate having a sliding fit with respect to the inside predetermined cross section of said shell, the periphery of said cover plate being notched radially inwardly at intervals matching said bent portions of said shell to be capable of receiving said bent portions, said periphery of said cover plate also being formed with inclined areas between said notched intervals, and a movable wall in said chamber and having a diaphragm portion the outer edge of which is clamped between said abutment means and said cover plate, said radially inwardly bent portions of said shell extending radially inwardly over the inclined areas of said periphery of said cover plate intermediate said notches to lock said cover plate to said shell.

3. In a fluid pressure servomotor and the like: a stamped open ended sheet metal shell forming an axially extending internal chamber of predetermined uniform cross section adjacent its open end, abutment means around the internal periphery of said shell and spaced a predetermined distance from said open end of said shell, said shell being slit at generally equally spaced intervals around the periphery of said uniform section of shell a predetermined distance axially outwardly of said abutment means to provide bendable portions of said shell between said slits and its open end, said portions being bent radially inwardly, an end cover plate having a sliding fit with respect to the inside predetermined cross section of said shell, the periphery of said cover plate being notched radially inwardly at intervals matching said bent portions of said shell to be capable of receiving said bent portions, said periphery being also formed with inclined areas between said notched intervals, said inclined areas having an angle outwardly from the open end of said shell, a movable wall in said chamber and having a diaphragm portion the outer edge of which is clamped in compression between said abutment means and said cover plate, said radially inwardly bent portions of said shell, and the peripheral edge portion of said cover plate having a tab bent axially outwardly to abut one of said bent portions of said shell extending radially inwardly over the inclined areas of said periphery of said cover plate intermediate said notches to bring about said compression and lock said cover plate to said shell.

4. In a fluid pressure servomotor and the like: a stamped open ended sheet metal shell forming an axially extending internal chamber of predetermined uniform cross section adjacent its open end, abutment means around the internal periphery of said shell and spaced a predetermined distance from said open end of said shell, said shell being slit at generally equally spaced intervals around the periphery of said uniform section of shell a predetermined distance axially outwardly of said abutment means to provide bendable portions of said shell between said slits and its open end, said portions being bent radially inwardly, an end cover plate having a sliding fit with respect to the inside predetermined cross section of said shell, the periphery of said cover plate being notched radially inwardly at intervals matching said bent portions of said shell to be capable of receiving said bent portions, and said periphery having outwardly inclined areas between said notched intervals, a movable wall in said chamber and having a diaphragm portion the outer edge of which is clamped between said abutment means and said cover plate, said radially inwardly bent portions of said shell extending radially inwardly over the axially outer face of said periphery of said cover plate and riding up said inclined area intermediate said notches to lock said cover plate to said shell, and the peripheral edge portion of said cover plate having an abutment radially extending from said end cover plate to engage said shell adjacent said open end and be clamped thereagainst as said radially inward portions ride up said inclined area.

5. In a sheet metal housing member and the like: a stamped open ended sheet metal shell forming an axially extending internal chamber of predetermined uniform cross section adjacent its open end, abutment means around the internal periphery of said uniform section of shell and spaced a predetermined distance from said open end of said shell, said shell being slit at generally equally spaced intervals around the periphery of said shell a predetermined distance outwardly of said abutment means to provide bendable portions of said shell between said slits and its open end, said portions being bent radially inwardly, an end cover plate having a sliding fit with respect to the inside predetermined cross section of said shell, the periphery of said cover plate being notched radially inwardly at intervals matching said bent portions of said shell to be capable of receiving said bent portions, with an inclined ramp intermediate said notched intervals, and resilient means operatively clamped between said abutment means and said cover plate to hold said cover plate against said bent portions, said radially inwardly bent portions of said shell extending inwardly over the inclined ramps of said periphery of said cover plate intermediate said notches to lock said cover plate to said shell.

References Cited in the file of this patent

UNITED STATES PATENTS

| | | |
|---|---|---|
| 2,525,695 | Lombard | Oct. 10, 1950 |
| 2,574,574 | Ives | Nov. 13, 1951 |
| 2,969,046 | Kellogg et al. | Jan. 24, 1961 |

FOREIGN PATENTS

| | | |
|---|---|---|
| 711,635 | Great Britain | July 7, 1954 |